(12) United States Patent
Ebara et al.

(10) Patent No.: US 8,177,687 B2
(45) Date of Patent: May 15, 2012

(54) POWER TRANSMISSION DEVICE (75) Inventors: Tasuhiko Ebara, Fujisawa (JP);
Hidetoshi Uji, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 378 days.

(21) Appl. No.: 12/514,811

(22) PCT Filed: Oct. 16, 2007

(86) PCT No.: PCT/JP2007/070124
§ 371 (c)(1),
(2), (4) Date: May 14, 2009

(87) PCT Pub. No.: WO2008/062616
PCT Pub. Date: May 29, 2008

(65) Prior Publication Data
US 2010/0048355 A1    Feb. 25, 2010

(30) Foreign Application Priority Data

Nov. 24, 2006  (JP) .................. 2006-317594

(51) Int. Cl.
*B60W 10/02* (2006.01)
*B60W 10/04* (2006.01)
(52) U.S. Cl. ............... 477/181; 477/178; 477/175
(58) Field of Classification Search ........... 477/175–181
See application file for complete search history.

(56) References Cited

U.S. PATENT DOCUMENTS

| | | | |
|---|---|---|---|
| 5,056,637 A * | 10/1991 | Miyawaki et al. | 477/39 |
| 6,102,831 A * | 8/2000 | Wakahara et al. | 477/169 |
| 6,334,835 B1 | 1/2002 | Tanaka et al. | |
| 6,380,641 B2 * | 4/2002 | Matsubara et al. | 290/40 C |
| 6,397,703 B1 * | 6/2002 | Iijima | 74/732.1 |
| 6,641,505 B2 * | 11/2003 | Sayman et al. | 477/177 |
| 6,770,008 B2 * | 8/2004 | Shinojima et al. | 477/71 |
| 7,628,260 B2 * | 12/2009 | Dickinson | 192/3.29 |
| 2004/0192493 A1 * | 9/2004 | Nitta | 475/331 |

FOREIGN PATENT DOCUMENTS

| | | |
|---|---|---|
| JP | S62-227824 A1 | 10/1987 |
| JP | H02-072858 A | 6/1990 |
| JP | H06-147303 A | 5/1991 |
| JP | H03-200433 A | 9/1991 |
| JP | H09-324827 A | 12/1997 |
| JP | H10-122352 A | 5/1998 |
| JP | 2000-274290 A | 10/2000 |
| JP | 2004-347063 A | 12/2004 |

OTHER PUBLICATIONS

International Search Report for PCT/JP2007/070124 dated Nov. 9, 2007.

* cited by examiner

*Primary Examiner* — Tisha Lewis
(74) *Attorney, Agent, or Firm* — McCormick, Paulding & Huber LLP (57) ABSTRACT

A power transmission device that can reliably prevent engine stall from occurring. The power transmission device includes a transmission clutch 3 interposed between an engine E and a transmission T/M, and control 22 for controlling connection and disconnection of the transmission clutch 3. The power transmission device also includes first engine stall risk determination 22 for determining based on an engine operation state whether there is an engine stall risk when the transmission clutch 3 is connected. The control 22 disconnects the transmission clutch 3 and controls the engine E to a predetermined rotation speed for a predetermined time when the determination by the first engine stall risk determination 22 is affirmed.

3 Claims, 7 Drawing Sheets

| ENGINE STALL RISK DETERMINATION FLAG | | LOCKUP CLUTCH | TRANSMISSION CLUTCH |
|---|---|---|---|
| SECOND ENGINE STALL RISK DETERMINATION FLAG IS ON | (PREVIOUS Nt1 − PRESENT Nt1) > V4 or (PREVIOUS Nt2 − PRESENT Nt2) > V3 | DISCONNECTION | FORCE PUSHING IN DISCONNECTION DIRECTION IS REDUCED BY VALUE CORRESPONDING TO PARTIAL ELECTRIC CURRENT $\alpha$ |
| FIRST ENGINE STALL RISK DETERMINATION FLAG IS ON | (PREVIOUS Nt1 − PRESENT Nt1) > V1 or (PREVIOUS Nt2 − PRESENT Nt2) > V2 | DISCONNECTION (BECAUSE V1 > V3, V2 > V4, THE SECOND ENGINE STALL RISK DETERMINATION FLAG ON CONDITION IS ALSO SATISFIED | DISCONNECTION |

FIG. 7

US 8,177,687 B2

POWER TRANSMISSION DEVICE

CROSS REFERENCE TO RELATED APPLICATIONS

This application is entitled to the benefit of and incorporates by reference essential subject matter disclosed in International Patent Application No. PCT/JP2007/070124 filed on Oct. 16, 2007 and Japanese Patent Application No. 2006-317594 filed Nov. 24, 2006.

TECHNICAL FIELD

The present invention relates to a power transmission device in which a transmission clutch is interposed between an engine and a transmission.

BACKGROUND ART

In a power transmission device for a vehicle, a transmission clutch is interposed between an engine and a transmission (see, for example, Japanese Patent Application Laid-Open No. H6-147303 and Japanese Patent Application Laid-Open No. H10-122352).

In such a power transmission device, control is performed to determine whether there is an engine stall risk (in other words, whether the engine has abruptly decelerated) on the basis of an engine operation state such as engine revolution speed. When the determination is affirmed, the transmission clutch is disconnected and a load, from the drive wheel side of the engine, is cut off from the transmission.

DISCLOSURE OF THE INVENTION

However, in the above-described control, when a clutch plate of the transmission clutch is not disconnected in a timely fashion and an engine torque becomes lower than the load transmitted from the drive wheel side, the engine cannot be prevented from stalling.

Accordingly, it is an object of the present invention to provide a power transmission device that can reliably prevent the occurrence of engine stall.

In order to resolve the above-described problems, the present invention provides a power transmission device with a transmission clutch interposed between an engine and a transmission, and control means for controlling connection and disconnection of the transmission clutch, including a first engine stall risk determination means for determining, based on an engine operation state, whether there is an engine stall risk when the transmission clutch is connected, wherein the control means disconnects the transmission clutch and controls the engine to a predetermined rotation speed for a predetermined time when the determination by the first engine stall risk determination means is affirmed.

The power transmission device may include a fluid coupling provided with a lockup clutch interposed between the engine and the transmission clutch, and second engine stall risk determination means for determining based on an engine operation state whether there is an engine stall risk that is lower than the engine stall risk determined by the first engine stall risk determination means when the transmission clutch is connected and the lockup clutch is connected, wherein the control means may disconnect the lockup clutch when the determination by the second engine stall risk determination means is affirmed.

The control means may apply a predetermined voltage or a predetermined electric current to an electromagnetic solenoid of the transmission clutch so that a pushing force of a clutch plate of the connected transmission clutch decreases within a range in which the pushing force does not exceed a torque point and does not result in disconnection when the determination by the second engine stall risk determination means is affirmed.

The present invention demonstrates an excellent effect of making it possible to provide a power transmission device that can reliably prevent engine stall from occurring.

BRIEF DESCRIPTION OF THE DRAWINGS

FIG. 3 is a flowchart of control when the first engine stall risk determination flag is ON.

FIG. 5 is a flowchart of control when the second engine stall risk determination flag is ON.

FIG. 7 is a diagram of control performed when the first and second engine stall risk determinations are ON.

BEST MODE FOR CARRYING OUT THE INVENTION

A preferred embodiment of the present invention will be described below in greater detail with reference to the appended drawings.

Figure 1:
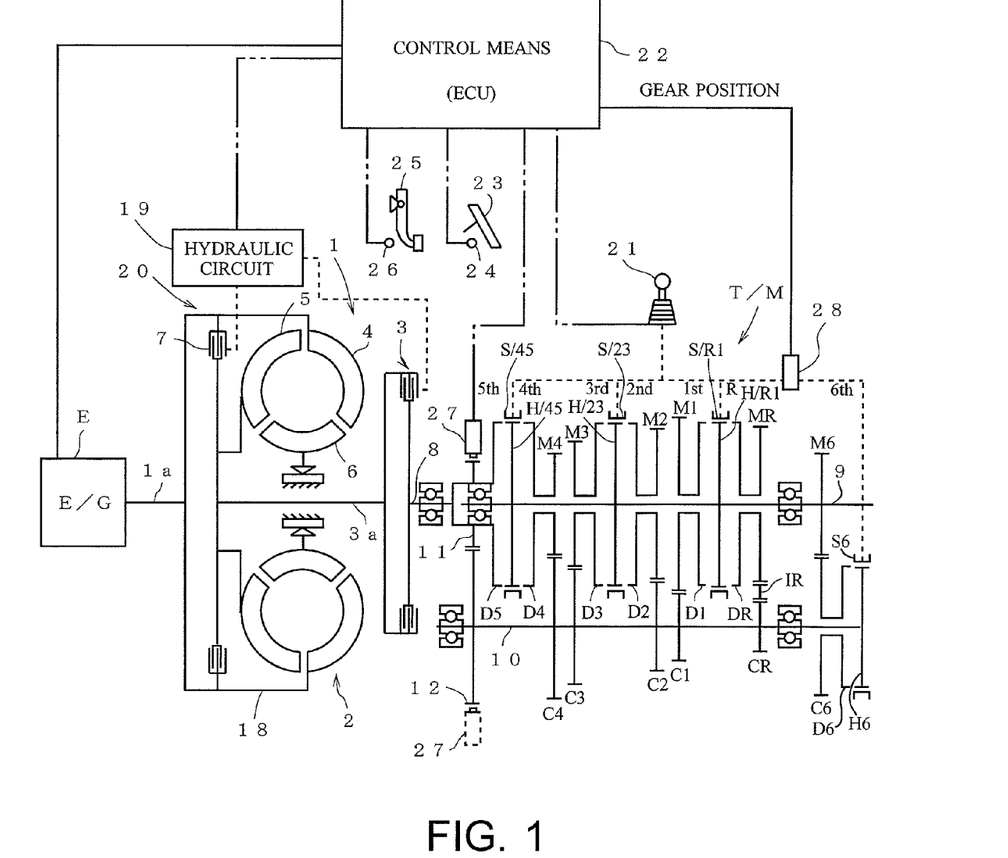
FIG. 1 is a schematic diagram of a power transmission device of an embodiment of the present invention.

FIG. 1 is a schematic diagram of a power transmission device of an embodiment of the present invention.

As shown in FIG. 1, a transmission T/M is connected via a clutch mechanism 1 to an engine E (in the present embodiment, a diesel engine). The clutch mechanism 1 is configured by a fluid coupling 2 and a wet multiplate clutch (transmission clutch) 3. The fluid coupling 2 is provided in a power transmission path from the engine E to the transmission T/M in the upstream side thereof, and the wet multiplate clutch 3 is provided in series therewith on the downstream side. The fluid coupling as referred to herein is a broad concept including, but not limited to, a torque converter. A torque converter is actually used in the present embodiment.

The fluid coupling 2 is configured by a pump unit 4 rotating integrally with a casing 18 connected to an output shaft (crankshaft) 1a of the engine E, a turbine unit 5 positioned opposite the pump unit 4 inside the casing 18 and connected to the input side of the wet multiplate clutch 3, and a stator unit 6 interposed between the turbine unit 5 and the pump unit 4. Furthermore, this fluid coupling 2 also has a lockup clutch 7 that performs connection and disconnection of the pump unit 4 and the turbine unit 5, and a lockup device 20 configured by a hydraulic circuit 19 that actuates the lockup clutch 7.

The input side of the wet multiplate clutch 3 is connected to the turbine unit 5 via an input shaft 3a, and the output side is connected to an input shaft 8 of the transmission T/M. The wet multiplate clutch connects and disconnects the fluid coupling 2 with the transmission T/M. The clutch is biased at all times in the disconnection direction by a spring (not shown in the figure) and the connection is performed by hydraulic pressure from the hydraulic circuit 19.

More specifically, the wet multiplate clutch 3 has clutch plates located in a clutch casing (not shown in the figure)

filled with oil. Clutch plates (or clutch disks) are alternately spline engaged with the input side and output side by a plurality of clutch plates on each side, and connection/disconnection of the wet multiplate clutch 3 is performed by pressing these clutch plates together or withdrawing from one another.

The transmission T/M has the input shaft 8, an output shaft 9 disposed coaxially therewith, and a countershaft 10 disposed parallel to these input shaft 8 and output shaft 9. An input main gear 11 is provided at the input shaft 8. A first-speed main gear M1, a second-speed main gear M2, a third-speed main gear M3, a fourth-speed main gear M4, and a reverse main gear MR are supported on the output shaft 9, and a sixth-speed main gear M6 is fixedly attached thereto. An input auxiliary gear 12 that meshes with the input main gear 11, a first-speed auxiliary gear C1 that meshes with the first-speed main gear M1, a second-speed auxiliary gear C2 that meshes with the second-speed main gear M2, a third-speed auxiliary gear C3 that meshes with the third-speed main gear M3, a fourth-speed auxiliary gear C4 that meshes with the fourth-speed main gear M4, and a reverse auxiliary gear CR that meshes with the reverse main gear MR via a idle gear IR are fixedly attached to the countershaft 10, and a sixth-speed auxiliary gear C6 that meshes with the sixth-speed main gear M6 is supported thereon.

With the transmission T/M, where a sleeve S/R1 that is spline engaged with a hub H/R1 fixed to the output shaft 9 is spline engaged with a dog DR of the reverse main gear MR, the output shaft 9 rotates in reverse, and where the sleeve S/R1 is spline engaged with a dog D1 of the first-speed main gear M1, the output shaft 9 rotates correspondingly to the first speed.

Where a sleeve S/23 that is spline engaged with a hub H/23 fixed to the output shaft 9 is spline engaged with a dog D2 of the second-speed main gear M2, the output shaft 9 rotates correspondingly to the second speed, and when the sleeve S/23 is spline engaged with a dog D3 of the third-speed main gear M3, the output shaft 9 rotates correspondingly to the third speed.

Where a sleeve S/45 that is spline engaged with a hub H/45 fixed to the output shaft 9 is spline engaged with a dog D4 of the fourth-speed main gear M4, the output shaft 9 rotates correspondingly to the fourth speed, and when the sleeve S/45 is spline engaged with a dog D5 of the input main gear 11, the output shaft 9 rotates correspondingly to the fifth speed (direct connection).

Where a sleeve S6 that is spline engaged with a hub H6 fixed to the countershaft 10 is spline engaged with a dog D6 of the sixth-speed auxiliary gear C6, the output shaft 9 rotates correspondingly to the sixth speed.

Each of the aforementioned sleeves S is manually operated by a shift lever 21 within a driver's cabin via a shift fork and a shift rod (not shown in the figure).

When gear shifting is performed with the shift lever 21, the shift lever is initially in neutral and the wet multiplate clutch 3 is disconnected. After shifting to another gear has been performed from the neutral position, the wet multiplate clutch 3 is connected. A gear position determined by the operation of the shift lever 21 is detected by a sensor 28 and inputted in a ECU 22 that serves as a control means.

A push-down amount of an accelerator pedal 23 is detected by a sensor 24, and this push-down amount is inputted in the ECU 22. A push-down amount of a brake pedal 25 is detected by a sensor 26, and this push-down amount is inputted in the ECU 22.

In the present embodiment, a rotation sensor 27 that detects a rotation speed (transmission input shaft rotation speed) of the input shaft 8 of the transmission T/M is provided at the input main gear 11 of the transmission T/M or at the input auxiliary gear 12 that meshes with the input main gear 11, and a detection value of this rotation sensor 27 is inputted in the ECU 22. When the detection value (transmission input shaft rotation speed) of the rotation sensor 27 is equal to or less than a set value (for example, 800 rpm), the ECU 22 actuates the lockup device 20 (hydraulic circuit 19) of the fluid coupling 2 to the disconnection side and disconnects the lockup clutch 7. When the detection value is equal to or higher than a set value (for example, 1000 rpm), the engine control unit actuates the lockup device 20 (hydraulic circuit 19) to the connection side and connects the lockup clutch 7.

In the present embodiment, the ECU 22 serving as a first engine stall risk determination means determines whether there is an engine stall risk (that is, whether the engine E has abruptly decelerated) on the basis of an engine operation state when the wet multiplate clutch 3 is connected. When the first engine stall risk determination is affirmed, the ECU 22 serving as a control means disconnects the wet multiplate clutch 3 and controls the engine E over a predetermined time to a predetermined rotation speed that is higher than the idling rotation speed.

Figure 2:
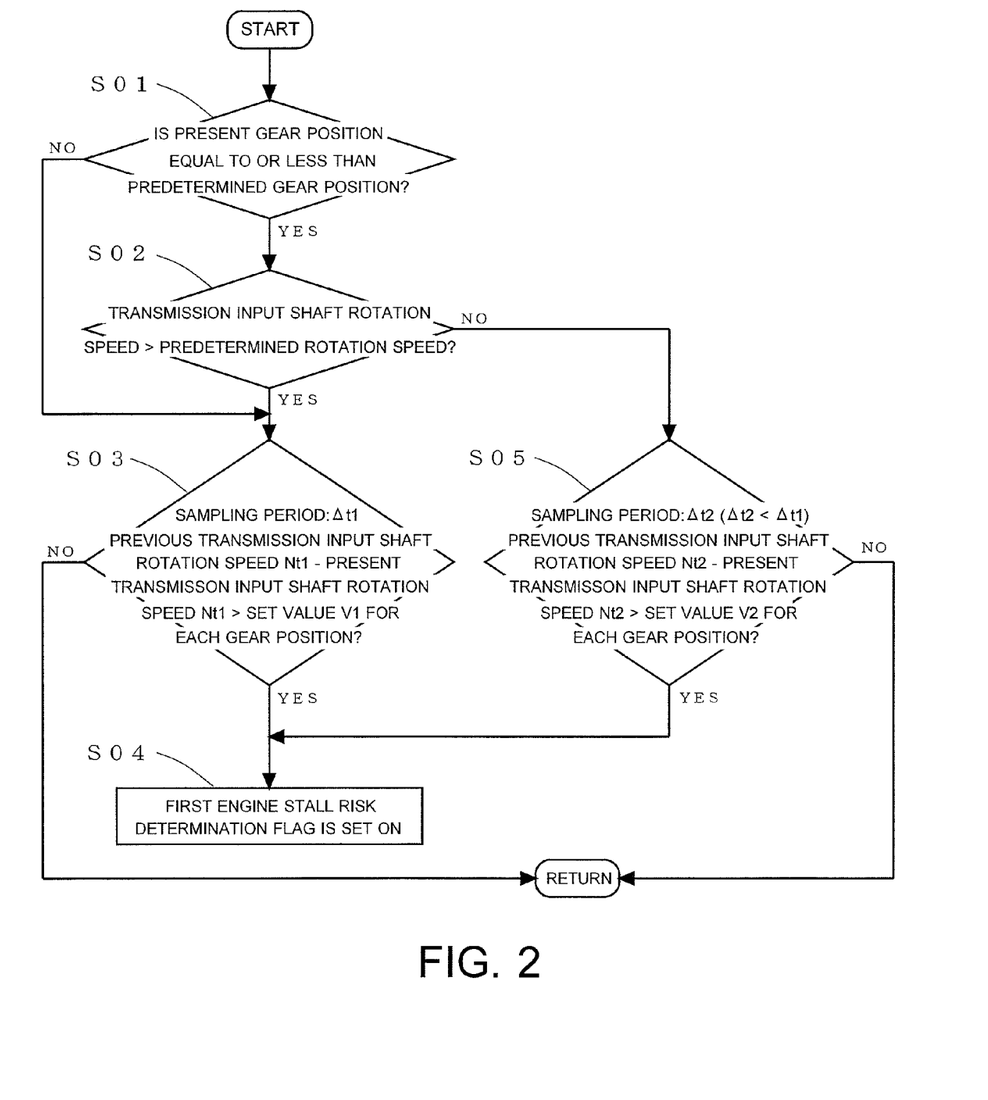
FIG. 2 is a flowchart of the first engine stall risk determination.

The first engine stall risk determination of the present embodiment will be explained below using a flowchart shown in FIG. 2.

More specifically, the ECU 22 sets a first engine stall risk determination flag to ON (step S04) when the present gear position detected by the sensor 28 is equal to or lower than a predetermined gear position (for example, the third speed) (step S01: YES), the transmission input shaft rotation speed detected by the rotation sensor 27 is higher than a predetermined rotation speed (for example, 1500 rpm) (step S02: YES), and a difference between a present transmission input shaft rotation speed Nt1 detected by the rotation sensor 27 with a sampling period of $\Delta t1$ (for example, 64 ms) and a previous transmission input shaft rotation speed Nt1 is larger than a set value V1 for each gear position (step S03: YES).

Furthermore, the ECU 22 sets a first engine stall risk determination flag to ON (step S04) when the present gear position detected by the sensor 28 is higher than a predetermined gear position (for example, the third speed) (step S01: NO) and a difference between a present transmission input shaft rotation speed Nt1 detected by the rotation sensor 27 with a sampling period of $\Delta t1$ (for example, 64 ms) and a previous transmission input shaft rotation speed Nt1 is larger than a set value V1 for each gear position (step S03: YES).

The ECU 22 also sets a first engine stall risk determination flag to ON (step S04) when the present gear position detected by the sensor 28 is equal to or lower than a predetermined gear position (for example, the third speed) (step S01: YES), the transmission input shaft rotation speed detected by the rotation sensor 27 is equal to or lower than a predetermined rotation speed (for example, 1500 rpm) (step S02: NO), and a difference between a present transmission input shaft rotation speed Nt2 detected by the rotation sensor 27 with a sampling period of $\Delta t2$ (for example, 16 ms) that is shorter than $\Delta t1$ ($\Delta t2 < \Delta t1$) and a previous transmission input shaft rotation speed Nt2 is larger than a set value V2 for each gear position (step S05: YES).

Thus, in the present embodiment, a decrease in the rotation speed of the transmission input shaft over a predetermined time is found when the wet multiplate clutch 3 is connected. Engine stall risk is determined to be present (in other words, the engine E is determined to decelerate abruptly) when this decrease amount is larger than the set values V1, V2 that have been set in advance.

Furthermore, a small sampling period is set (Δt2<Δt1) when the present gear position is equal to or less than a predetermined gear position and the transmission input shaft rotation speed is equal to or less than a predetermined rotation speed because when a large sampling period is set the wet multiplate clutch 3 is not disconnected in a timely fashion and engine stall can occur.

Figure 3:
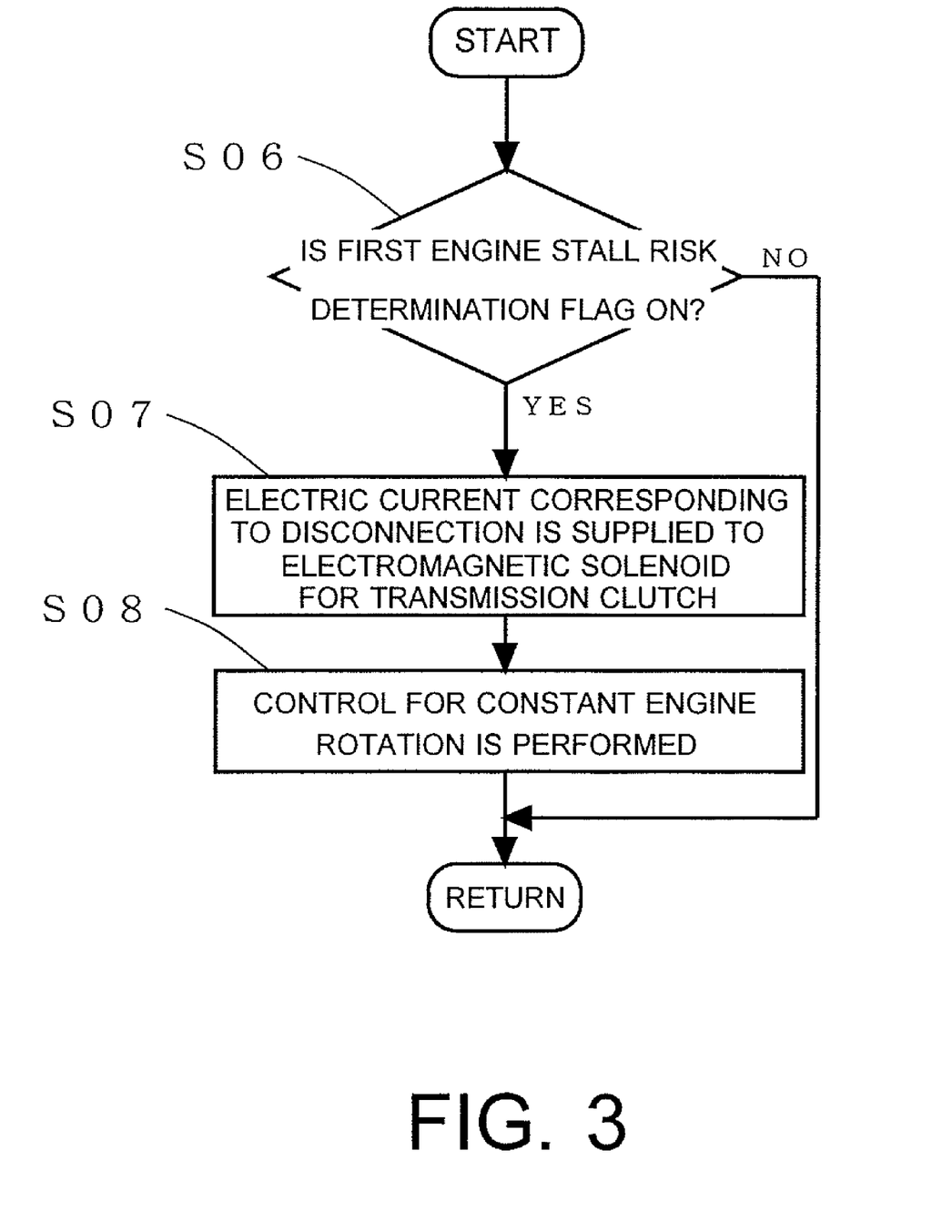

Control performed when the first engine stall risk determination flag is ON will be explained below using the flowchart shown in FIG. 3.

When the first engine stall risk determination flag is ON (step S06: YES), the ECU 22 supplies an electric current corresponding to disconnection (for example, 0.8 A) to the electromagnetic solenoid of the wet multiplate clutch 3, disconnects the wet multiplate clutch 3 (step S07; see FIG. 7) and controls the engine E for a predetermined time (for example, 1 sec) to a predetermined rotation speed (for example, 800 rpm) that is higher than an idling rotation speed (for example, 520 to 570 rpm) (step S08).

Furthermore, in the present embodiment, when the wet multiplate clutch 3 is connected and the lockup clutch 7 is connected, the ECU 22 performing the second engine stall risk determination determines based on an engine operation state, whether there is an engine stall risk that is lower than the engine stall risk based on the first engine stall risk determination (in other words, whether the engine E has decelerated abruptly). When the second risk determination is affirmed, the ECU 22 serving as the control means disconnects the lockup clutch 7 and applies a predetermined voltage or a predetermined electric current to the electromagnetic solenoid of the connected wet multiplate clutch 3 so that a pushing force of a clutch plate of the connected wet multiplate clutch 3 decreases within a range in which the force does not exceed the torque point and does not result in disconnection.

The abrupt deceleration of the engine E in the second engine stall risk determination is slower than the abrupt deceleration of the engine E in the first engine stall risk determination.

Figure 4:
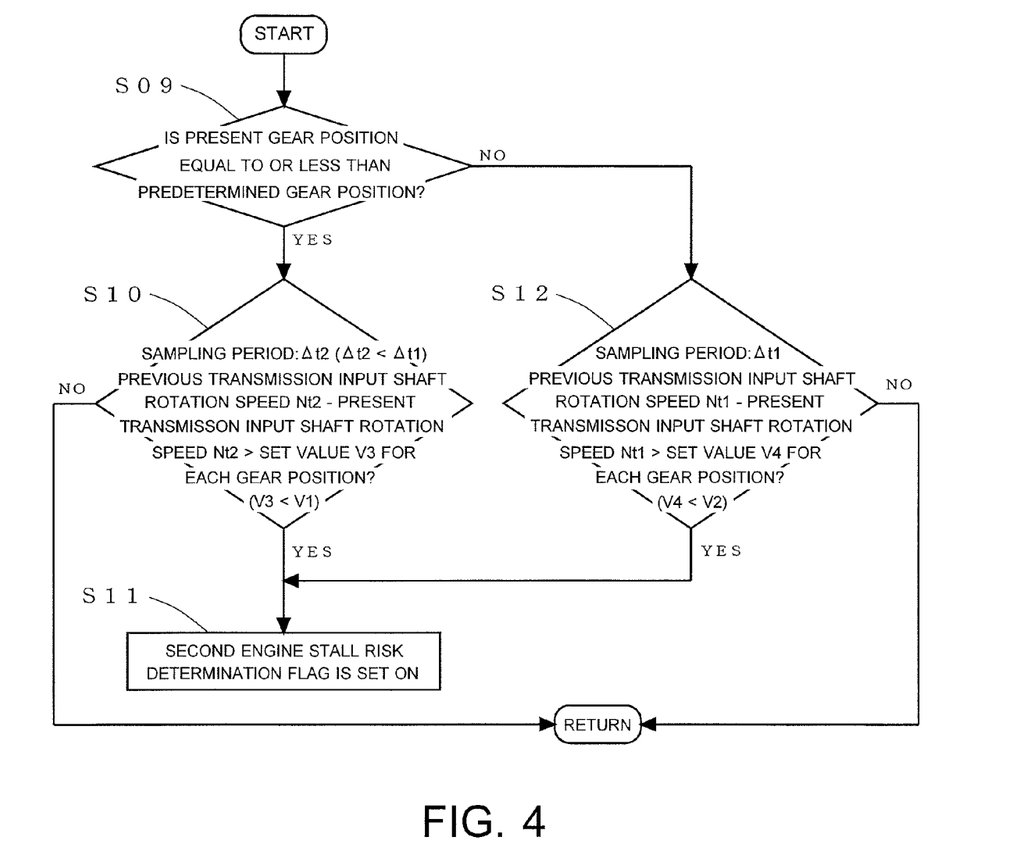
FIG. 4 is a flowchart of the second engine stall risk determination.

The second engine stall risk determination of the present embodiment will be explained below using the flowchart shown in FIG. 4.

More specifically, the ECU 22 sets a second engine stall risk determination flag to ON (step S11) when the present gear position detected by the sensor 28 is equal to or lower than a predetermined gear position (for example, the third speed) (step S09: YES) and a difference between a present transmission input shaft rotation speed Nt2 determined by the rotation sensor 27 with a sampling period of Δt2 (for example, 16 ms) and a previous transmission input shaft rotation speed Nt2 is larger than a set value V3 (V3<V1) for each gear position (step S10: YES).

Furthermore, the ECU 22 sets a second engine stall risk determination flag to ON (step S11) when the present gear position detected by the sensor 28 is higher than a predetermined gear position (for example, the third speed) (step S09: NO) and a difference between a present transmission input shaft rotation speed Nt1 determined by the rotation sensor 27 with a sampling period of Δt1 (for example, 64 ms) and a previous transmission input shaft rotation speed Nt1 is larger than a set value V4 (V4<V2) for each gear position (step S12: YES).

Thus, in the present embodiment, a decrease in the rotation speed of the transmission input shaft over a predetermined time is found when the wet multiplate clutch 3 is connected and the lockup clutch 7 is connected. Engine stall risk is determined to be present (in other words, the engine E is determined to decelerate abruptly) when this decrease is larger than the set values V3, V4 that have been set in advance.

Furthermore, a small sampling period is set (Δt2<Δt1) when the present gear position is equal to or less than a predetermined gear position because where a large sampling period is set the wet multiplate clutch 3 is not disconnected timely and engine stall can occur.

Figure 5:
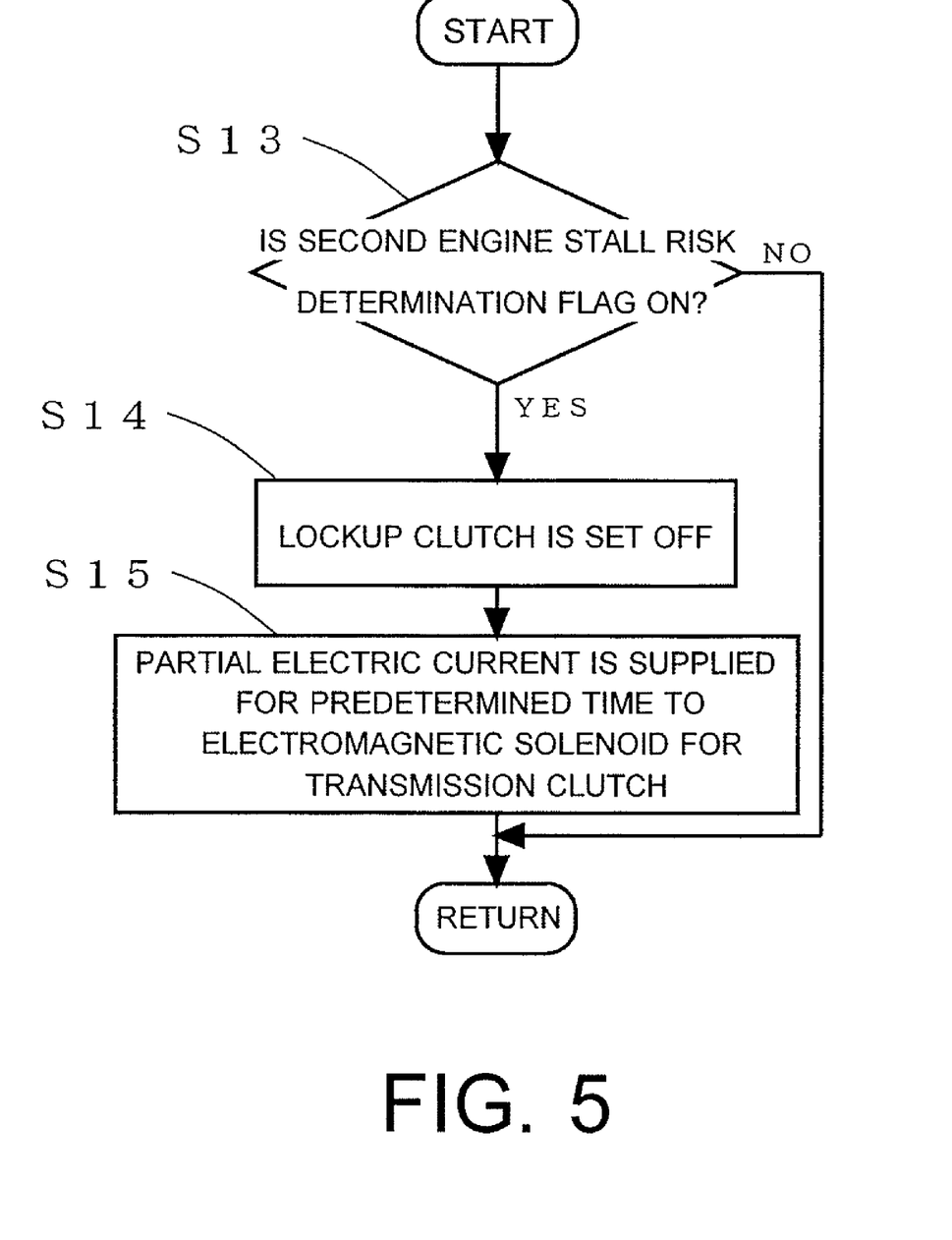

Control performed when the second engine stall risk determination flag is ON will be explained below using the flowchart shown in FIG. 5.

Figure 7:
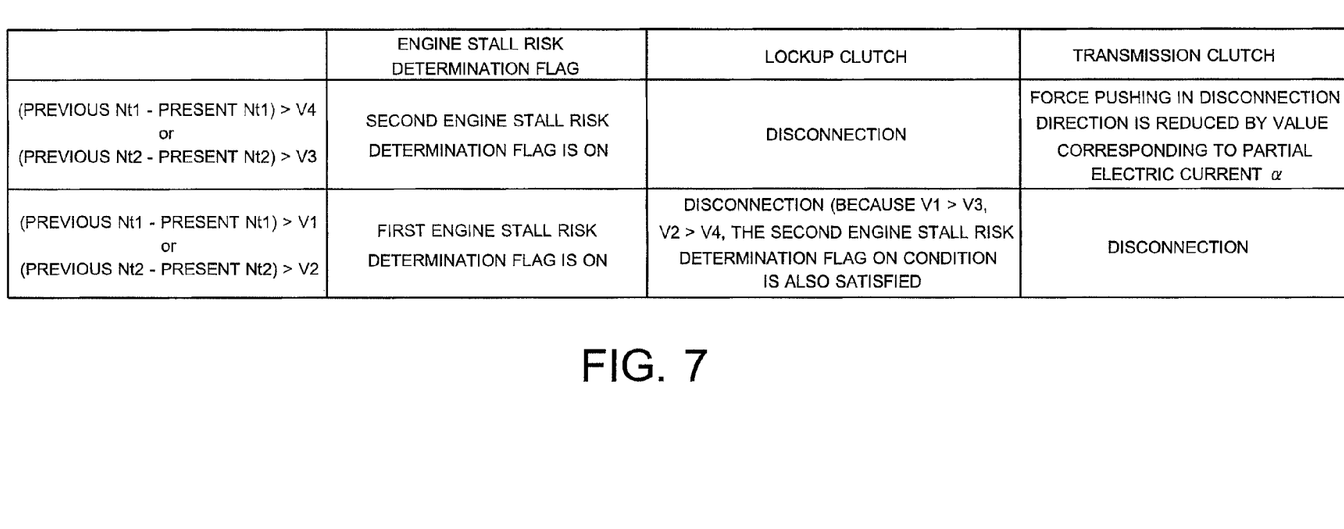

When the second engine stall risk determination flag is ON (step S13: YES), the ECU 22 actuates the lockup device 20 (hydraulic circuit 19) of the fluid coupling 2 to the disconnection side, disconnects the lockup clutch 7 (step S14; FIG. 7) and also supplies a partial electric current α (for example, 0.2 A) that is lower than an electric current corresponding to disconnection (for example, 0.8 A) to the electromagnetic solenoid of the connected wet multiplate clutch 3 for a predetermined time (for example 0.4 sec), and decreases a pushing force of a clutch plate of the connected wet multiplate clutch 3 within a range in which the force does not exceed the torque point and does not result in disconnection (step S15; see FIG. 7).

Figure 6:
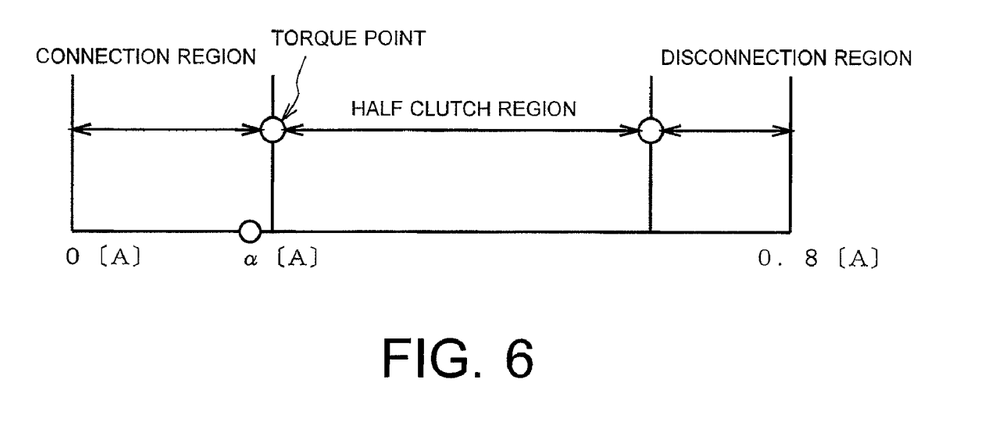
FIG. 6 is a diagram of electric current supply to an electromagnetic solenoid for a transmission clutch.

In this case the partial electric current α is set so that it is lower than an electric current corresponding to the torque point and that the clutch plate of the connected wet multiplate clutch 3 does not slide (see FIG. 6).

In the present description, the torque point is defined as the point at which a clutch plate of the wet multiplate clutch 3 starts sliding when the clutch plate is moved from the connection side in the disconnection direction (see FIG. 6). Where the partial electric current α is set to an electric current such that the torque point is exceeded and a half clutch region shown in FIG. 6 is reached, during deceleration such that the second engine stall risk determination flag is ON and the first engine stall risk determination flag is OFF, friction is advanced because the transmission clutch is maintained in the half clutch state (usually, when the driver operates the clutch, even when the transmission clutch may be disconnected during deceleration, an operation such that maintains the half clutch state is not performed).

The operation of the power transmission device of the present embodiment will be explained below.

In the power transmission device, the power of the engine E is transmitted via the fluid coupling 2, wet multiplate clutch 3, and transmission T/M in the order of description.

When the vehicle is started, the lockup clutch 7 and wet multiplate clutch 3 are disconnected, and where the driver shifts to a start position by operating the shift lever 21, the wet multiplate clutch 3 is connected, and because the turbine unit 5 of the fluid coupling 2 is stopped from the drive wheel side in this state, only the pump unit 4 rotates and a creep force is produced. Where the brake pedal 25 is thereafter released or the accelerator pedal 23 is stepped on, the turbine unit 5 rotates and power is transmitted to the transmission T/M.

After the vehicle starts moving, a shifting operation is performed with the shift lever 21, and the wet multiplate clutch 3 is connected or disconnected each time this operation is performed.

The ECU 22 performs control so that the rotation of the input main gear 11 of the transmission T/M or of the input auxiliary gear 12 that meshes with the input main gear 11 is detected by the rotation sensor 27, the lockup clutch 7 is connected when the detection value is equal to or higher than a set value (for example 1000 rpm), and the lockup clutch 7 is disconnected when the detection value of the rotation sensor 27 becomes equal to or less than a predetermined value (for example, 800 rpm), for example, when the vehicle is stopped.

In the present embodiment, when the first engine stall risk determination is affirmed, the ECU 22 disconnects the wet multiplate clutch 3 and controls the engine E to a predetermined rotation speed for a predetermined time, thereby making it possible to prevent the engine torque from becoming lower than a load transmitted from the drive wheel side and also making it possible to avoid a state in which the clutch plates of the wet multiplate clutch 3 are not disconnected in a timely fashion and the engine torque becomes lower than the load transmitted from the drive wheel side.

Furthermore, when the second engine stall risk determination is affirmed, the ECU 22 disconnects the lockup clutch 7, thereby canceling the lockup of the fluid coupling 2. Therefore, power transmission from the engine E to the transmission T/M is performed by the fluid coupling 2 and the load from the drive wheel side is transmitted by the fluid coupling 2 to the engine E. Therefore, engine stall can be avoided.

Moreover, when the second engine stall risk determination is affirmed, the ECU 22 applies a predetermined voltage or a predetermined electric current to the electromagnetic solenoid of the wet multiplate clutch 3 so that a pushing force of a clutch plate of the connected wet multiplate clutch 3 decreases within a range in which the force does not exceed the torque point and does not result in disconnection. As a result, the clutch plate of the wet multiplate clutch 3 can be thereafter (when the first engine stall risk determination is affirmed) rapidly disengaged and the engine stall risk can be avoided more effectively.

The preferred embodiment of the present invention is explained above, but the present invention is not limited to the above-described embodiment, and various other embodiments can be employed.

What is claimed is:

1. A power transmission device provided with a transmission clutch interposed between an engine and a transmission, and control means for controlling connection and disconnection of the transmission clutch, the power transmission device comprising:

first engine stall risk determination means for determining based on an engine operation state whether there is an engine stall risk when the transmission clutch is connected, wherein the control means disconnects the transmission clutch and controls the engine to a predetermined rotation speed for a predetermined time when the determination by the first engine stall risk determination means is affirmed, a fluid coupling provided with a lockup clutch interposed between the engine and the transmission clutch, and second engine stall risk determination means for determining based on an engine operation state whether there is an engine stall risk that is lower than the engine stall risk determined by the first engine stall risk determination means when the transmission clutch is connected and the lockup clutch is connected, wherein the control means disconnects the lockup clutch when the determination by the second engine stall risk determination means is affirmed.

2. The power transmission device according to claim 1, wherein the control means applies a predetermined voltage or a predetermined electric current to an electromagnetic solenoid of the transmission clutch so that a pushing force of a clutch plate of the connected transmission clutch decreases within a range in which the pushing force does not exceed a torque point and does not result in disconnection when the determination by the second engine stall risk determination means is affirmed.

3. The power transmission device according to claim 1, wherein the control means controls the engine to a predetermined rotation speed for a predetermined time when the determination by the first engine stall risk determination means is affirmed.

* * * * *

UNITED STATES PATENT AND TRADEMARK OFFICE
CERTIFICATE OF CORRECTION

| | |
|---|---|
| PATENT NO. | : 8,177,687 B2 |
| APPLICATION NO. | : 12/514811 |
| DATED | : May 15, 2012 |
| INVENTOR(S) | : Tatsuhiko Ebara and Hidetoshi Uji |

It is certified that error appears in the above-identified patent and that said Letters Patent is hereby corrected as shown below:

On the title page item (75), the name of the first inventor should read --Tatsuhiko Ebara--.

Signed and Sealed this
Twenty-eighth Day of August, 2012

David J. Kappos
*Director of the United States Patent and Trademark Office*